United States Patent
Bhamidipati et al.

(10) Patent No.: US 9,031,358 B2
(45) Date of Patent: May 12, 2015

(54) VIDEO RETARGETING USING SEAM CARVING

(71) Applicant: QUALCOMM Incorporated, San Diego, CA (US)

(72) Inventors: PhaniKumar K. Bhamidipati, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 13/834,580

(22) Filed: Mar. 15, 2013

(65) Prior Publication Data

US 2014/0270534 A1 Sep. 18, 2014

(51) Int. Cl.
G06K 9/32 (2006.01)
G06T 3/40 (2006.01)

(52) U.S. Cl.
CPC .................................... *G06T 3/40* (2013.01)

(58) Field of Classification Search
USPC .................................................. 382/195, 298
See application file for complete search history.

(56) References Cited

U.S. PATENT DOCUMENTS

| | | | |
|---|---|---|---|
| 7,747,107 B2 * | 6/2010 | Avidan et al. | 382/298 |
| 8,160,398 B1 | 4/2012 | Avidan et al. | |
| 8,213,747 B2 | 7/2012 | Gerhard et al. | |
| 8,270,766 B1 | 9/2012 | Avidan et al. | |
| 8,625,932 B2 * | 1/2014 | Intwala | 382/298 |
| 2010/0060547 A1 | 3/2010 | Bloebaum et al. | |
| 2010/0086207 A1 * | 4/2010 | Bernal et al. | 382/171 |
| 2010/0128181 A1 | 5/2010 | Jagmag | |
| 2010/0303384 A1 * | 12/2010 | Knee | 382/298 |
| 2011/0085745 A1 * | 4/2011 | Kumar et al. | 382/298 |
| 2011/0182502 A1 * | 7/2011 | Liang | 382/162 |
| 2011/0206294 A1 * | 8/2011 | Yokokawa et al. | 382/276 |
| 2011/0206295 A1 * | 8/2011 | Tokunaga et al. | 382/298 |
| 2011/0310216 A1 | 12/2011 | Lee et al. | |
| 2012/0093221 A1 | 4/2012 | Rodriguez et al. | |

OTHER PUBLICATIONS

Grundmann, "Discontinuous Seam-Carving for Video Retargeting", IEEE Conference on Computer Vision and Pattern Recognition (CVPR), 2010, 8pgs.
Liu, et al., "Video Retargeting: Automating Pan and Scan", Proceedings of the 14th annual ACM international conference on Multimedia, 2006, pp. 241-250.
Rodgers, Z., "Video Ad Networks Embrace Retargeting", ClickZ, Feb. 2010, 2 pgs.
Wolf, et al., "Content-driven Video Retargeting", International Conf. on Computer Vision, ICCV 2007, 2pgs.

* cited by examiner

*Primary Examiner* — John Strege
(74) *Attorney, Agent, or Firm* — Loza & Loza LLP (57) ABSTRACT

Aspects of the present disclosure provide improved image resizing techniques including seam craving and seam lining that consider image content in addition to geometric constraints. In one aspect of the disclosure, the energy for each of the pixels of an image is determined in accordance with an energy function. A line energy is determined for each straight line of the image, and the line energy corresponds to a sum of the energy of the pixels in each straight line. A plurality of starting points are identified for a plurality of seams corresponding to the straight lines having the lowest line energy. Further, the paths for each of the seams are determined. The image may be resized by removing the seams from the image.

26 Claims, 8 Drawing Sheets

VIDEO RETARGETING USING SEAM CARVING

TECHNICAL FIELD

Aspects of the present disclosure relate generally to methods for resizing an image, and more particularly, to methods for resizing an image using seam carving techniques.

BACKGROUND

Wireless communication networks are widely deployed to provide various communication services such as telephony, video, data, messaging, broadcasts, and so on. In many different scenarios, such as for the transmission of images or streaming video media, it is desirable to resize the images. Some conventional methods of resizing an image to a different (larger or smaller) size include image scaling, downsampling, and cropping to remove pixels around the boundary.

Another method for image resizing, known in the art, is called seam carving. Seam carving may be referred to in the literature as image retargeting, content-aware image resizing, content-aware scaling, liquid resizing, or liquid rescaling. Seam carving can be advantageous over other image resizing methods, as it enables consideration of the image content, not just geometric constraints, thereby providing a content-aware resizing of an image. A seam is a connected path of low-energy pixels, which crosses an image from top to bottom, or from left to right, etc. Seam carving can be utilized to resize or retarget an image by carving out or inserting pixels in different parts of the image. Seam carving generally utilizes an energy function, defining an "importance" of the pixels of the image. By successively removing or inserting seams, the size of an image may be reduced or increased, respectively.

For image size reduction, seam selection ensures that while preserving the important image structure, more of the low energy pixels may be removed, and few of the high energy pixels may be removed. For image size enlargement, the order of seam insertion ensures a balance between the original content and the artificially inserted pixels. While seam carving is known in the art, there is still room for improvement in the process, e.g., in terms of computational efficiency, as well as for image quality, especially relating to video retargeting (resizing of video streams).

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide improved image resizing techniques including seam craving and seam lining that consider image content in addition to geometric constraints.

In one aspect of the disclosure, a method of resizing an image including a plurality of pixels is provided. The method includes determining energy for each of the pixels in accordance with an energy function; determining a line energy for each straight line of the image, the line energy corresponding to a sum of the energy of the pixels in each straight line; identifying a plurality of starting points for a plurality of seams corresponding to the straight lines having the lowest line energy; determining paths for each of the seams; and resizing the image by removing the seams from the image.

In another aspect of the disclosure, a method of resizing an image including a plurality of pixels is provided. The method includes: determining energy for each of the pixels in accordance with an energy function; identifying a plurality of seams in the image based on the energy of the pixels; identifying at least one partial seam based on an outlier method or global thresholds; and resizing the image by removing the seams and partial seams from the image.

In another aspect of the disclosure, an apparatus for resizing an image including a plurality of pixels is provided. The method includes: means for determining energy for each of the pixels in accordance with an energy function; means for determining a line energy for each straight line of the image, the line energy corresponding to a sum of the energy of the pixels in each straight line; means for identifying a plurality of starting points for a plurality of seams in the straight lines having the lowest line energy; means for determining paths for each of the seams; and means for resizing the image by applying the seams to the image.

In another aspect of the disclosure, an apparatus for resizing an image including a plurality of pixels is provided. The apparatus includes: means for determining energy for each of the pixels in accordance with an energy function; means for identifying a plurality of seams in the image based on the energy of the pixels; means for identifying at least one partial seam based on an outlier method or global thresholds; and means for resizing the image by applying the seams and partial seams to the image.

In another aspect of the disclosure, an apparatus for resizing an image including a plurality of pixels is provided. The apparatus includes a processor and a memory operatively coupled to the processor. The processor is configured to: determine energy for each of the pixels in accordance with an energy function; determine a line energy for each straight line of the image, the line energy corresponding to a sum of the energy of the pixels in each straight line; identify a plurality of starting points for a plurality of seams in the straight lines having the lowest line energy; determine paths for each of the seams; and resize the image by applying the seams to the image.

In another aspect of the disclosure, an apparatus for resizing an image including a plurality of pixels is provided. The apparatus includes: a processor and a memory operatively coupled to the processor. The processor is configured to: determine energy for each of the pixels in accordance with an energy function; identify a plurality of seams in the image based on the energy of the pixels; identify at least one partial seam based on an outlier method or global thresholds; and resize the image by applying the seams and partial seams to the image.

In another aspect of the disclosure, a computer software product is provided. The computer software product includes a computer-readable medium including code for causing an apparatus, for processing an image comprising a plurality of pixels, to: determine energy for each of the pixels in accordance with an energy function; determine a line energy for each straight line of the image, the line energy corresponding to a sum of the energy of the pixels in each straight line; identify a plurality of starting points for a plurality of seams in the straight lines having the lowest line energy; determine paths for each of the seams; and resize the image by applying the seams to the image.

In another aspect of the disclosure, a computer software product is provided. The computer software product includes a computer-readable medium including code for causing an apparatus, for processing an image including a plurality of pixels, to: determine energy for each of the pixels in accordance with an energy function; identify a plurality of seams in the image based on the energy of the pixels; identify at least one partial seam based on an outlier method or global thresholds; and resize the image by applying the seams and partial seams to the image.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In a similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

There are several occasions where an image needs to be resized. Standard image scaling is generally oblivious to image content and typically is applied uniformly. Cropping is limited because it can only remove pixels from the image periphery. Hence, an effective resizing can be achieved by considering the image content and not just geometric constraints. One such technique is generally known in the art as seam carving. A seam is defined as a connected path of pixels (e.g., low energy pixels) crossing an image from top to bottom or from left to right. Seam carving is an image operator that can change the size of an image by gracefully carving out or inserting pixels in different parts of the image. Seam carving uses an energy function defining the importance of pixels in the image. By successively removing or inserting seams, the size of an image can either be reduced or increased (i.e., retargeted).

For image size reduction, seams are selected to preserve the image structure. That is, more of the low energy pixels will be removed than the high energy pixels. For image enlarging, the order of seam inserting ensures a balance between the original content and the artificially inserted pixels. These operators, in effect, produce a content aware resizing of images. There are several energy functions that may be used, from simple methods such as a gradient measure to more complex methods such as a neighborhood intensity function or an entropy measure. However, the present disclosure is not limited to these energy functions. Other suitable energy functions may be used in various aspects.

Figure 1:
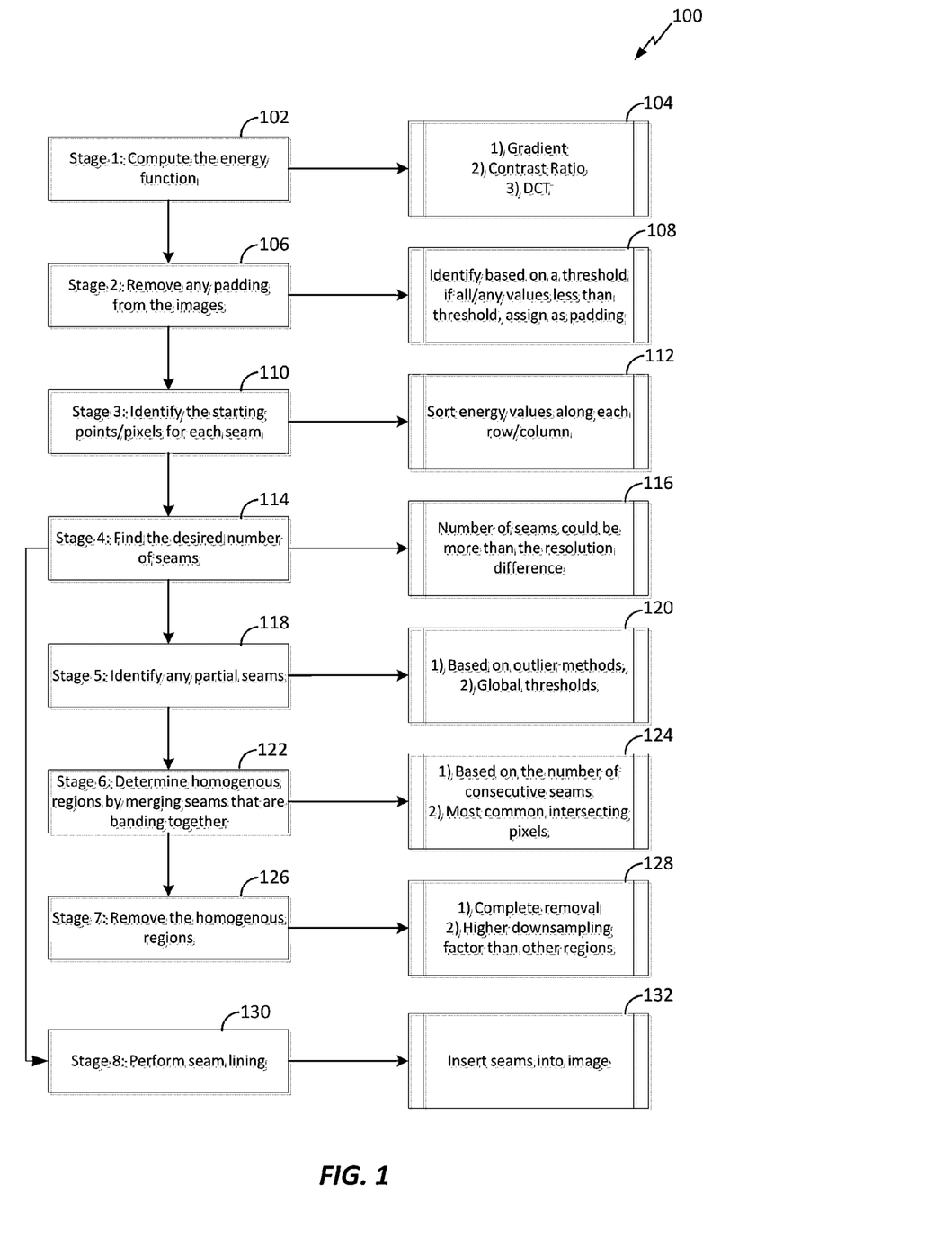
FIG. 1 is a block diagram conceptually illustrating methods of image resizing or retargeting using seam carving and seam lining in accordance with aspects of the disclosure.
Figure 2:
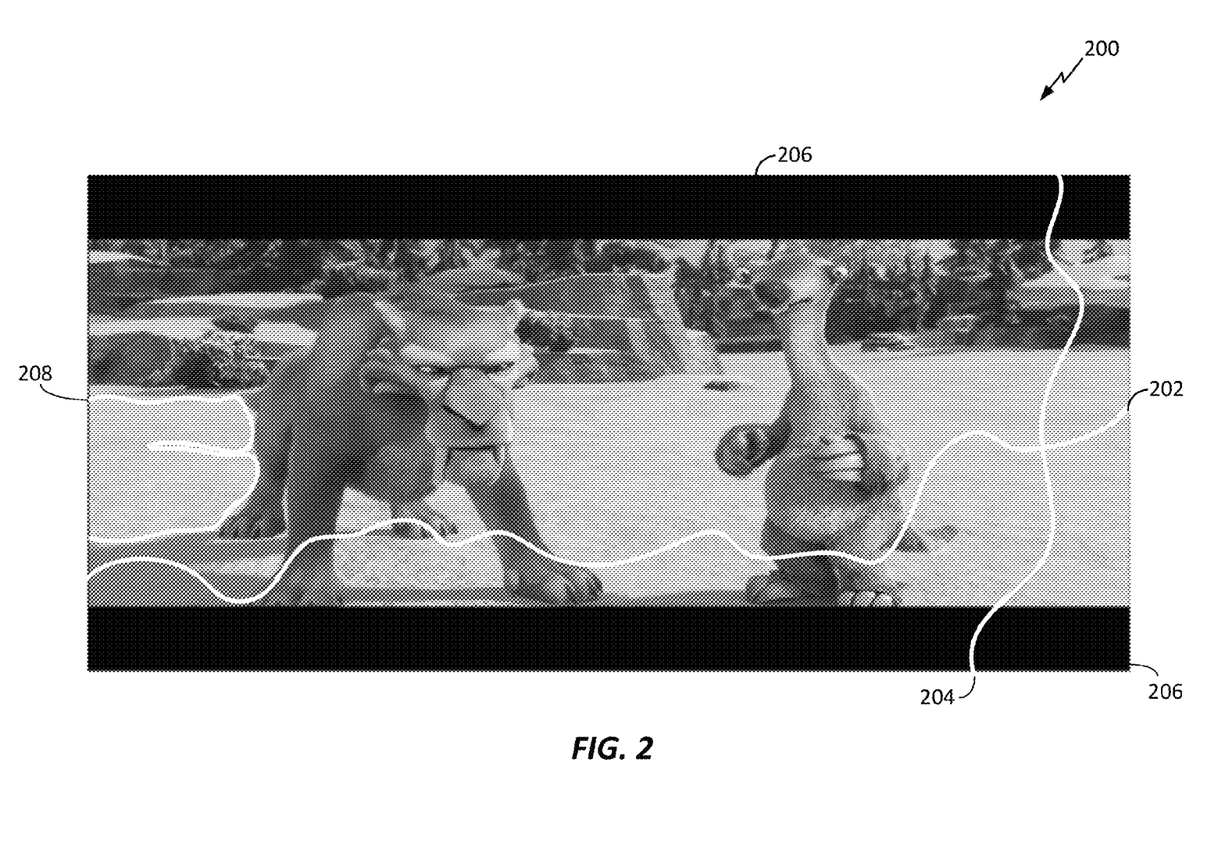
FIG. 2 shows an image of a frame in a video sequence for illustrating the methods of FIG. 1.

FIG. 1 is a block diagram 100 conceptually illustrating methods of image resizing or retargeting using seam carving and seam lining (described in further detail below) in accordance with aspects of the present disclosure. Various stages are illustrated in one particular order in FIG. 1, but the disclosure is not necessarily limited to the order shown in FIG. 1. In some aspects, some stages may be applied in a different order, some stages may be omitted, and other stages may be added. By way of example, stages 1 through 7 illustrated in FIG. 1 may be performed for every image in a video sequence. In another example, these stages may be performed only on key frames (e.g., intra frames), and suitable motion estimation techniques may be used to deduce the regions for the remaining frames (inter frames). In another example, stages 1-4 and 8 may be performed to apply seam lining to enlarge an image, for example, at an apparatus receiving the image. FIG. 2 shows an image 200 of a frame in a video sequence that may be resized using the methods of FIG. 1. A horizontal seam 202 and a vertical seam 204 are shown in FIG. 2 as examples.

At stage 1 (102), an energy function corresponding to the image 200 (see FIG. 2) may be computed or selected. There are various energy functions (104) that may be used to compute the energy in the image 200, some of which include a gradient, a contrast ratio, or a discrete cosine transform (DCT). However, other suitable energy functions may be used.

At stage 2 (106), any padding or border (e.g., borders 206 in FIG. 2) may be removed from the image 200. In one aspect, the padding may be identified based on a suitable threshold, that is, if any or all values (e.g., luma values) of the pixels are less than a given threshold, those pixels may be assigned as padding and removed (108). In this way, the image may immediately become smaller, so fewer seams may need to be identified and removed.

At stage 3 (110), the starting points/pixels (hereafter "starting points") for each seam are identified. The starting points may be identified by various suitable methods. In one example, to identify the starting points for the seams (e.g., seams 202 and 204 in FIG. 2), the energy (e.g., gradient) of the first row or column of pixels in the image 200 are determined, and the lowest energy (e.g., lowest gradient) pixels of the row or column may be chosen as the starting points. Here, one issue with using the first row or column energy values as starting points for the seams is that if there are black borders in the image, the sum of energy of the pixels of the selected seams may not be the lowest. This issue may be alleviated by including the removal of any borders or padding in the image, as described above at stage 2 (106).

Figure 3:
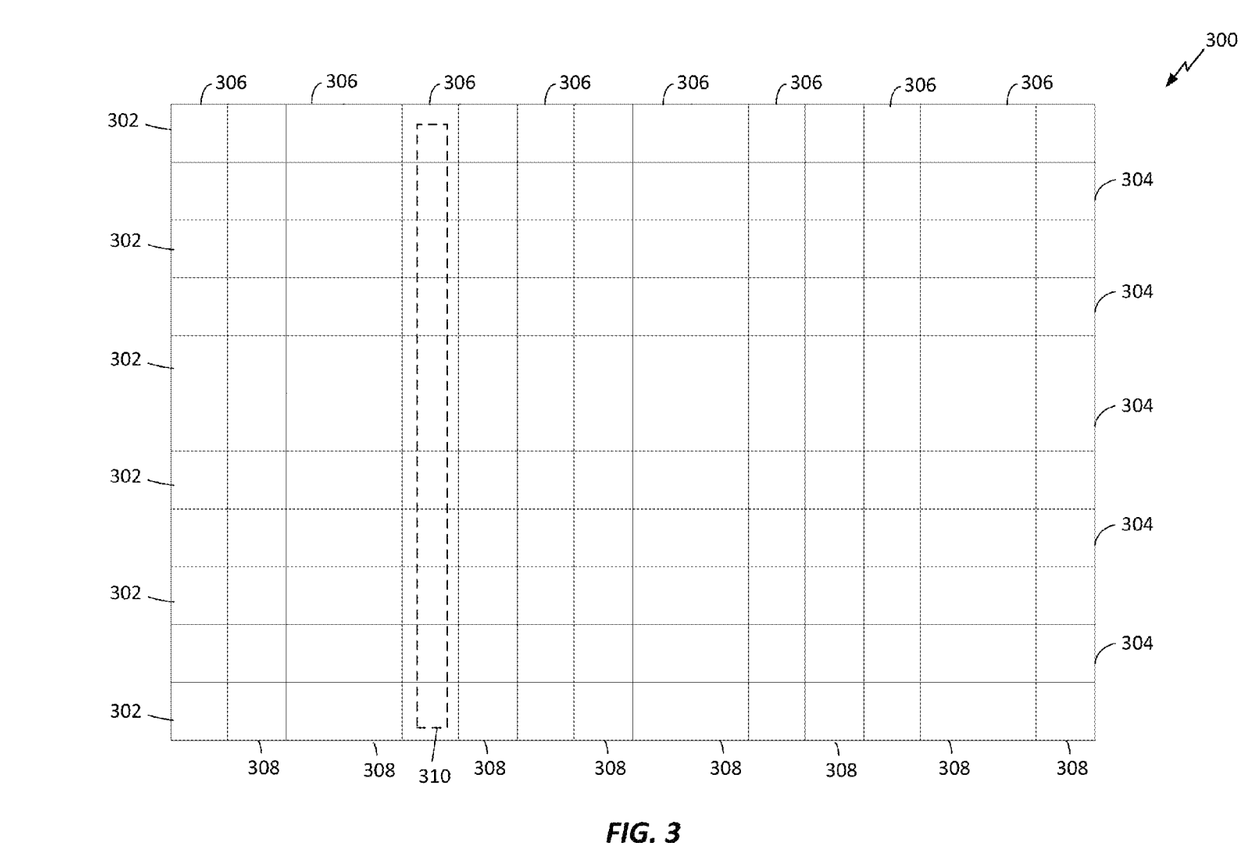
FIG. 3 is a drawing for illustrating methods for identifying the starting points of seams in an image in accordance with aspects of the disclosure.

FIG. 3 is a drawing for illustrating methods for identifying the starting points of seams in an image 300, while not substantially distorting the image, in accordance with aspects of the disclosure. In FIG. 3, each box corresponds to a pixel of the image. The number of pixels shown in FIG. 3 is non-limiting, and the present disclosure may be applied to any image (e.g., image 200) with any number of pixels.

Referring back to FIG. 1, another way to identify the starting points of seams may be performed by sorting (112) the rows and/or columns of pixel based on the sum of their energy along its column or row, respectively. Here, the initial energy estimates assume all the rows or columns are in straight lines (e.g., column 310 in FIG. 3). For example, if vertical seams are to be identified, the line energy equal to a vertical sum of all the energies along each row may be computed and sorted. Similarly, if horizontal seams are to be identified, the line energy equal to a horizontal sum of all the energies along each column may be computed and sorted. Accordingly, the start points of the seams may be identified.

In one example, the starting points of the seams (e.g., seams 202 and 204) may be alternately identified, from opposite edges of the image. For example, in the case of horizontal seams, starting points may be chosen alternately between the left pixels 302 and the right pixels 304 of the image. In the case of vertical seams, starting points may be chosen alternately between the top pixels 306 and bottom pixels 308 of the image.

Figure 4:
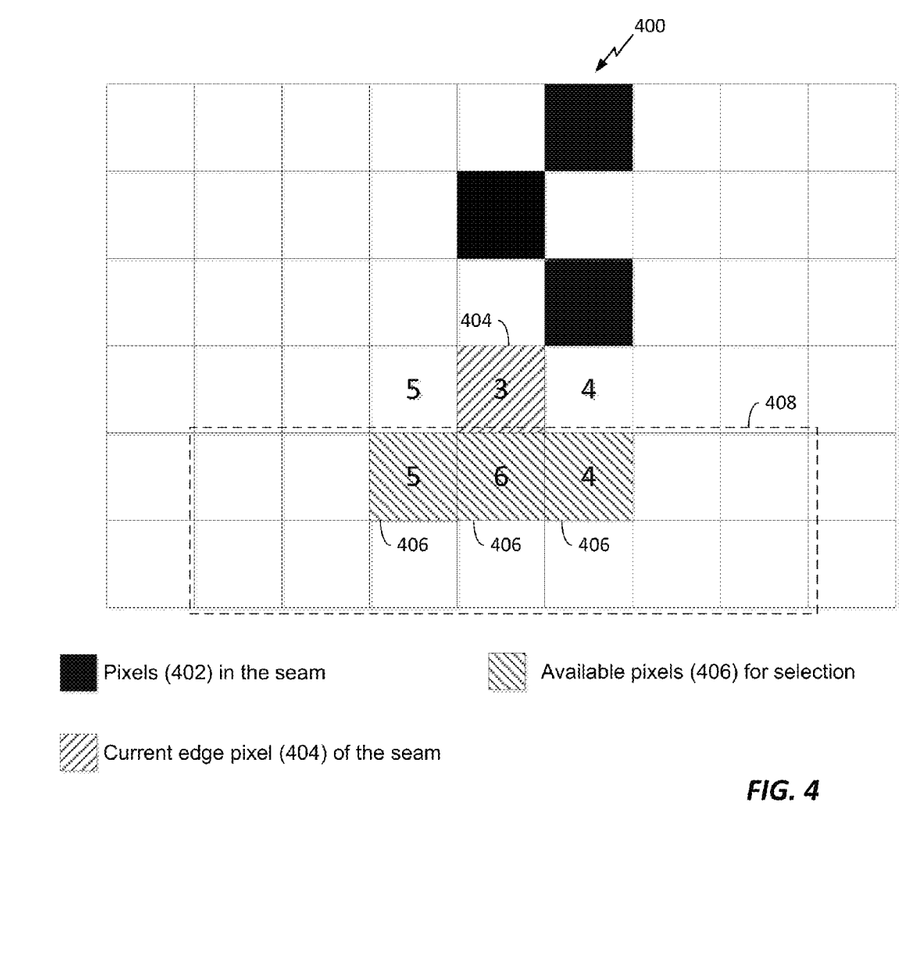
FIG. 4 is a drawing for illustrating methods for determining the path of a seam in accordance with aspects of the disclosure.

Once the starting point is identified for a seam, the path of the seam needs to be determined. The next pixel or the direction of the seam may be determined using any one or more of multiple approaches. FIG. 4 is a drawing for illustrating methods for determining the path of a seam 400 in accordance with aspects of the disclosure. The path of the seam 400 refers to the route or path how the seam traverses across the image between opposite edges. The methods applied to the seam 400 may be used on the seams 202 and 204 to determine their respective paths. Referring to FIG. 4, some pixels 402 in the seam 400 have already been identified, and the pixel 404 represents the current edge of the seam 400. The next step is to identify the next pixel of the seam in the path. For example, the possible options for the next pixel may include a pixel from the pixels 406 below the current edge pixel 404 of the seam. The numbers shown in the pixels in FIG. 4 represent relative energy values of the corresponding pixels. For example, the pixels 406 have energy of 4, 5, and 6, respectively, and the current edge pixel 404 has an energy value of 3.

In one example, referred to as "basic" seam carving, is to select the next pixel in the seam 400 by selecting the lowest energy pixel among the available pixels 406. Referring to FIG. 4 and by using this method, the pixel chosen may be the pixel 406 to the lower right of the current edge pixel 404 because the lower right pixel has an energy value of 4.

In another example, referred to as a "neighborhood" approach, the next pixel in the seam 400 is selected based on a neighborhood of pixels. In FIG. 4, a neighborhood 408 has a window size of 7×2 as one illustrative example. In other examples, the size of the window (neighborhood) may be chosen differently for different applications. Here, by calculating the median energy, mean energy, average energy, or any other suitable function values for each of the left and right portions of the neighborhood 408, and weighting them with each of the pixels 406, respectively, one may determine the path of the seam 400 and avoid falling into local minima. In one example, the following functions may be used for neighborhood-based seam carving.

GlobalLeftPixelEnergy=median(LeftNeighborhood)
 *$W$+(1-$W$)*LeftPixelEnergy

GlobalRightPixelEnergy=median(RightNeighborhood)*$W$+(1-$W$)*RightPixelEnergy

New Pixel=minimum(GlobalLeftPixelEnergy,GlobalRightPixelEnergy, Energy of pixel directly below current edge)

Here, $W$ is a weighting factor, which is used to weigh the immediate left/right pixel and their respective neighborhoods. In some examples, $W$ may have a value of 0.5 or 0.6. However, other suitable values of $W$ may be used. The neighborhood 408 may or may not include the column directly below the current edge pixel 404 of the seam. In some examples, a neighborhood may include pixels above the current edge pixel 404 as well.

Referring back to FIG. 1, at stage 4 (114), the desired number of seams may be found based on the above-described methods. In one example, more than a desired number of seams may be identified first, and then, only the needed number of seams may be removed (116) from the image. In this way, the algorithm 100 may avoid false low energy seams. As an example, for conversion from HD resolution (e.g., 720) to WVGA resolution (e.g., 480), only 240 (720–480) seams need to be removed. That is, extra seams, e.g., 360 (720/2) seams, may be identified, out of which the 240 seams having the lowest energy may be removed. Here, the energy of a seam corresponds to a sum of the energy of all the pixels in the seam. As described above, the energy of a pixel may be determined by any suitable functions such as gradient, contrast ratio, DCT, etc.

Figure 7:
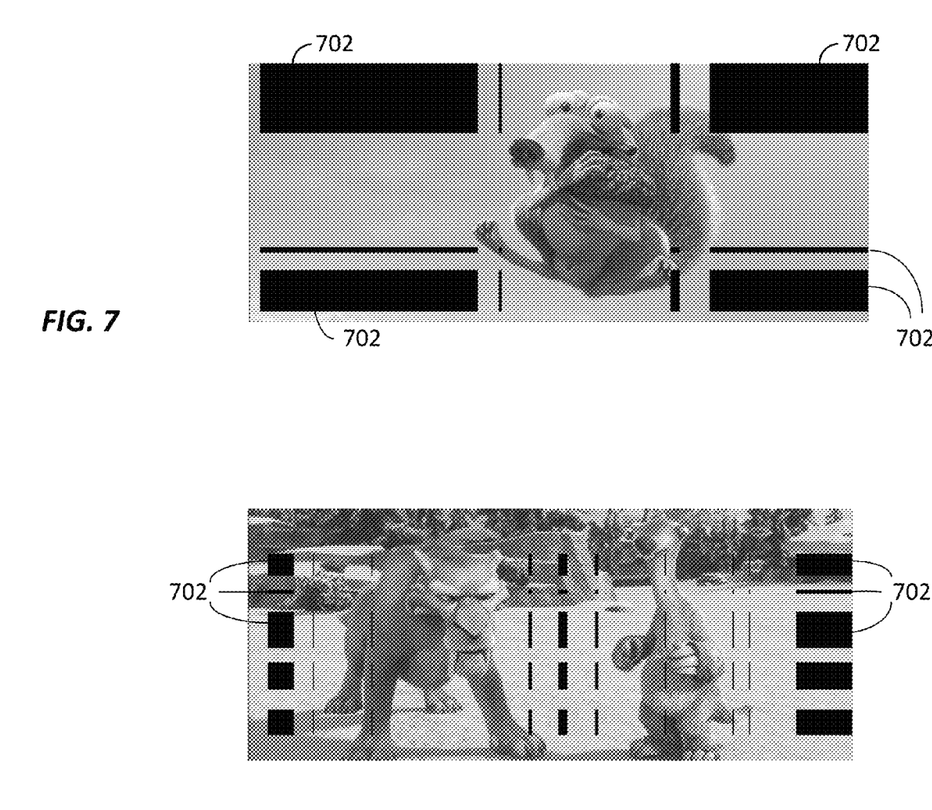
FIG. 7 shows two images for illustrating homogeneous regions.
Figure 8:
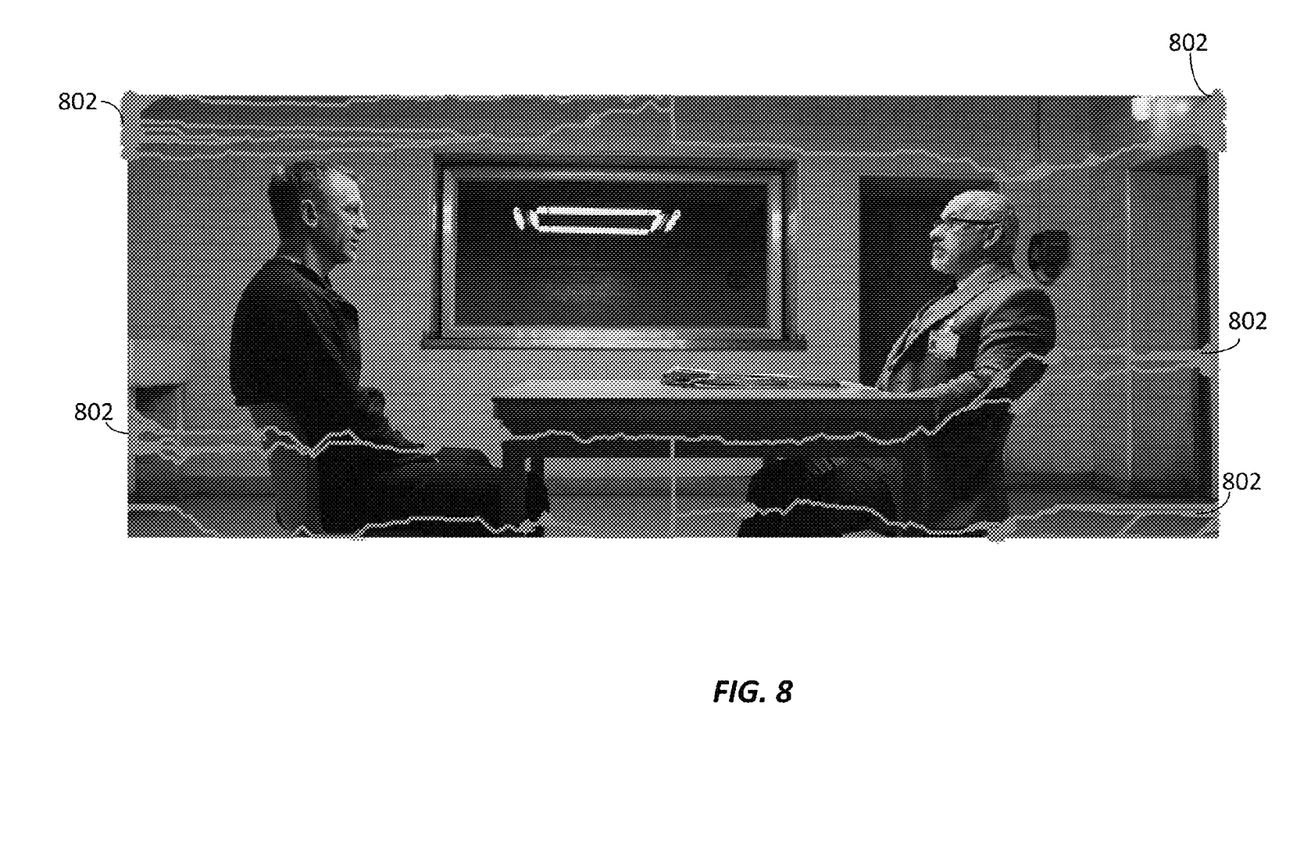
FIG. 8 shows an image for illustrating partial seams.

At stage 5 (118), any "partial" seams may be identified. Here, seams that do not run across the entire image (either horizontal or vertical) are referred to as "partial" seams. In seam carving, it is generally desired not to remove any important details from the image, and only to remove areas that are homogeneous. One factor in finding a homogeneous region is to be able to let a seam stop if certain conditions are met. FIG. 7 shows two images for illustrating homogeneous regions that may be identified by using partial seams. Some of the homogeneous regions 702 of the images are identified in the image. FIG. 8 shows an image for illustrating partial seams. Some of the partial seams 802 are identified in the image.

Identification of partial seams can be done in several ways. In one example, an outlier method (120) may be used. First, all the suitable seams in an image are found as described above, and then the algorithm examines each individual seam and determines if any pixels within that seam are outliers. An outlier refers to the statistics of the energy of the pixels in the seam. For example, if nearly all the pixels in the seam have low energy, but one of the pixels suddenly has a high energy, that pixel is a statistical outlier. In various examples, outlier detection can be based on simple moving window statistics, or a complex function based on neighboring seams and neighboring pixel values. In another example, global thresholds method (120) may be utilized, wherein if a pixel within a seam exceeds a given threshold, the seam may be terminated such that the seam is a partial seam.

At stage 6 (122), homogeneous regions (e.g., region 208 in FIG. 2) within the image may be identified, e.g., by merging the seams that band together. In general, homogeneous regions may be safely removed without compromising the image content. In video retargeting application, one important consideration is not to remove any important details from the video and only remove areas that are homogenous. To this end, once all the seams are identified, those seams that tend to band together and form a region may be chosen for removal, hence removing the homogenous regions.

As described above, identified partial seams may be used to identify homogeneous regions in an image. In other examples, homogeneous regions may be identified based on the number of consecutive seams in the image (124). In yet another example, homogeneous regions may be identified according to the most common intersecting pixels (124). In any case, once these homogenous regions are identified, at stage 7 (126), these regions can be removed (128) and the remaining image can be downscaled (128) without distorting the image. That is, once seam carving is completed, in some examples, the remaining image may be down sampled using generally known methods (e.g., scaling).

In yet another example, once all the seams are identified, this information can be used to identify a Region of Interest (ROI). If a particular region does not have any seams passing through it, it is most likely the active regions in an image and hence a ROI. Thus, the ROI can be extracted by using the seam information.

In video streams resizing (video retargeting), individual frames may be resized; however, this approach can result in jittery artifacts due to a lack of temporal coherency. With seam carving, as another approach, a video stream may be treated as a 3D volume, with a series of images stacked upon one another. Here, the seam may be extended, such that instead of following a 1D path on a single 2D image, the seam may follow a 2D path in the 3D volume. For example, video frames may be treated as a 3D cube, and the seams may be viewed a 2D manifolds in a 3D volume. A search for seam selection may be done utilizing the granularity of shots. Here, a shot is essentially a sequence of frames where the camera shoots continuously, or a sequence of frames in which there are no scene changes. In another example, a search for seam selection may be done utilizing regions in the image plane that are of low importance according to some suitable criteria in all video frames.

Figure 5:
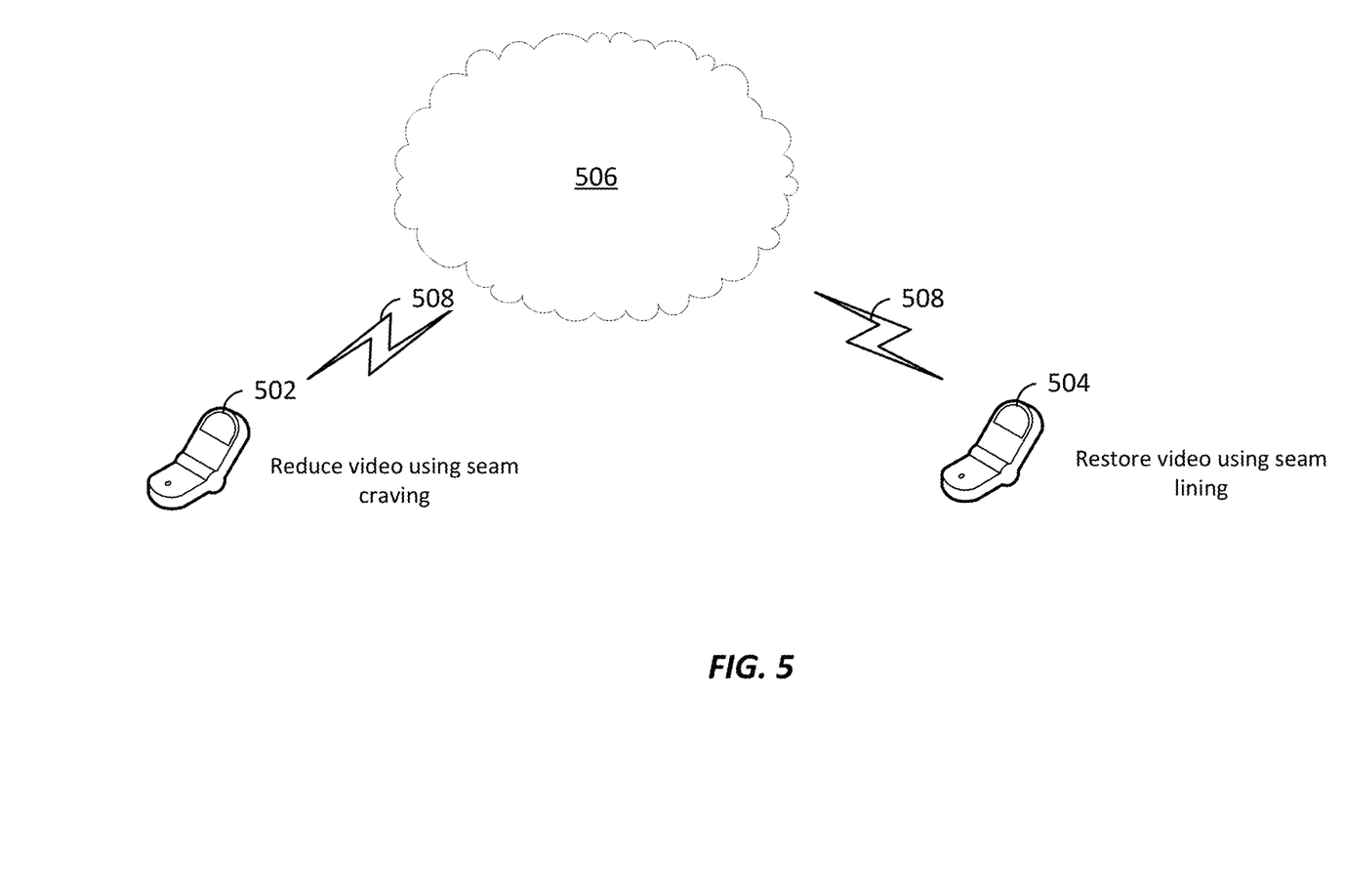
FIG. 5 is a drawing illustrating a first access terminal transmitting a resized image or video to a second access terminal through a communications network.

FIG. 5 is a drawing illustrating a first access terminal 502 transmitting a resized image or video to a second access terminal 504 through a communications network 506. The network 506 may be a wired or wireless network such as a Universal Mobile Telecommunications System (UMTS) network or other suitable data networks. In one example, the first access terminal 502 sends a video stream 508 to the second access terminal 504 through the communications network 506. At the source side, the first access terminal 502 may reduce the size or resolution of the video stream 508 using seam carving as described above in FIG. 1. At the receiving end (sink side), the second access terminal 504 may perform an inverse operation to obtain the original resolution video from the resized version received.

In one example, the access terminal 504 may apply seam lining (130, FIG. 1) to restore the video. Seam lining (130) corresponds to an inverse operation of seam carving, wherein seams are introduced or inserted (132) between pixels based on the energy level in the input image. It is not necessary for the same energy function to be used for seam lining at the receiving side (e.g., access terminal 504), as was used for the seam carving at the sending side. Further, in some aspects, the seams identified at the source may or may not be used in a seam lining procedure. Seam lining may insert (132) artificial seams into the image. In one example, the second access terminal 504 (sink side) may identify the optimal horizontal or vertical seams using the same energy function used by the first access terminal 502 (source side), and pixels at the seam may be duplicated by averaging them with their neighboring pixels (e.g., left and right neighbors for a vertical seam, or top and bottom neighbors for a horizontal seam). In some examples, it may be appropriate to take care not to select multiple seams at the same location, so as not to stretch out a part of an image.

Figure 6:
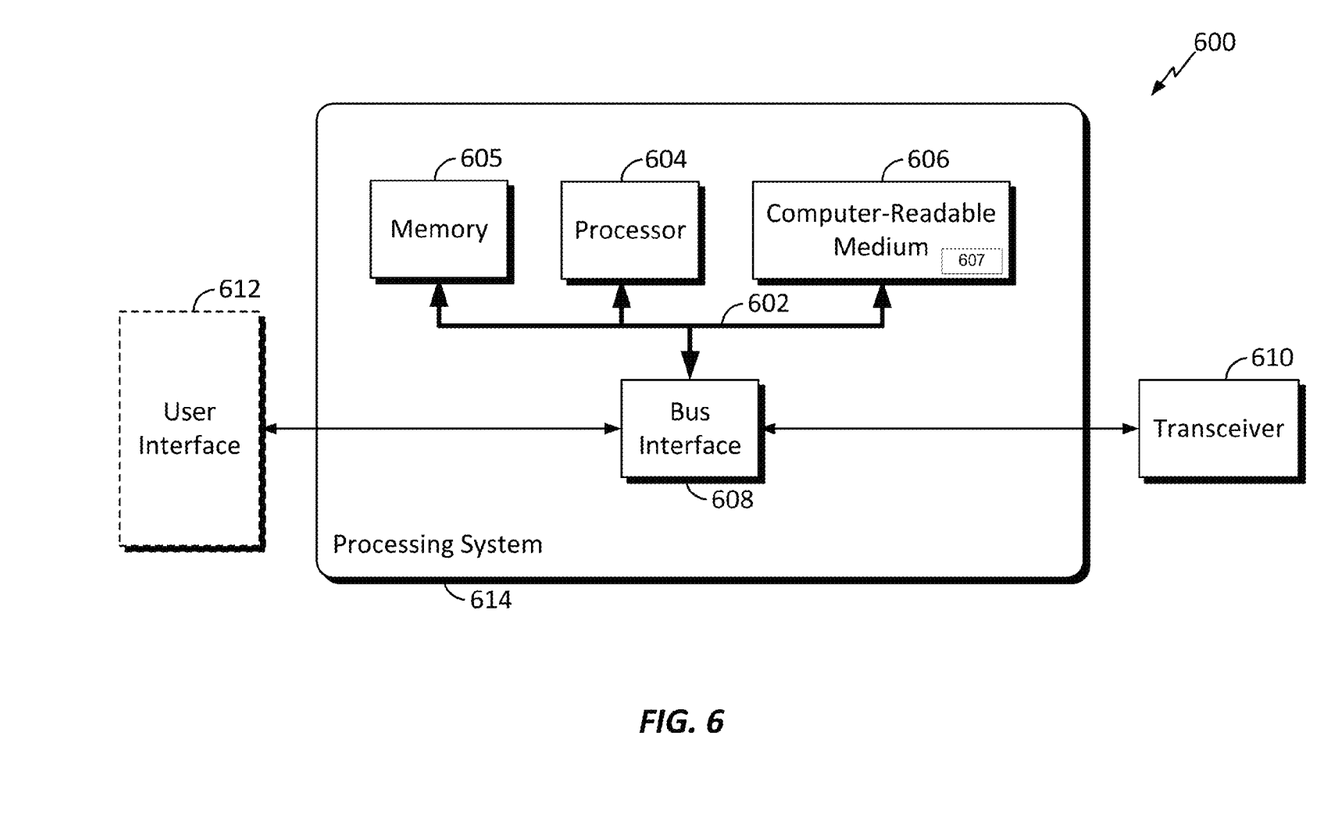
FIG. 6 is a block diagram illustrating an example of a hardware implementation for an apparatus employing a processing system in accordance with an aspect of the disclosure.

FIG. 6 is a conceptual block diagram illustrating an example of a hardware implementation for an apparatus 600 employing a processing system 614 in accordance with an aspect of the disclosure. In accordance with various aspects of the disclosure, an element, or any portion of an element, or any combination of elements may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software 607 stored on the computer-readable medium 606. The software 607, when executed by the processor 604, causes the processing system 614 to perform the various functions described herein (e.g., seam carving 100) for any particular apparatus. The computer-readable medium 606 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer software or program product for processing an image (e.g., image 200). By way of example, a computer program product may include a computer-readable medium in packaging materials. Those skilled in the art will recognize how best to implement the described functionality presented throughout this disclosure depending on the particular application and the overall design constraints imposed on the overall system.

In one configuration, the apparatus 600 includes means for determining energy for each of the pixels of an image 200 in accordance with an energy function (e.g., gradient, contrast ratio, and DCT); means for determining a line energy for each straight line of the image, the line energy corresponding to a sum of the energy of the pixels in each straight line; means for identifying a plurality of starting points for a plurality of seams in the straight lines having the lowest line energy; means for determining paths for each of the seams; and means for resizing the image by applying the seams to the image.

In one configuration, the apparatus 600 includes means for determining energy for each of the pixels of an image 200 in accordance with an energy function (e.g., gradient, contrast ratio, and DCT); means for identifying a plurality of seams in the image based on the energy of the pixels; means for identifying at least one partial seam based on an outlier method or global thresholds; and means for resizing the image by applying the seams and partial seams to the image.

In one aspect, the aforementioned means may be the processor 604 in which the invention resides from FIG. 6 configured to perform the functions recited by the aforementioned means. In another aspect, the aforementioned means may be a module or any apparatus configured to perform the functions recited by the aforementioned means.

It is to be understood that the specific order or hierarchy of steps in the methods disclosed herein is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of resizing an image comprising a plurality of pixels, comprising:
   determining energy for each of the pixels in accordance with an energy function;
   determining a line energy for each straight line of the image, the line energy corresponding to a sum of the energy of the pixels in each straight line;
   identifying a plurality of starting points for a plurality of seams corresponding to the straight lines having the lowest line energy;
   determining paths for each of the seams; and
   resizing the image by removing the seams from the image.

2. The method of claim 1, wherein the straight lines comprise rows or columns of the image.

3. The method of claim 1, wherein the determining paths for each of the seams comprise selecting pixels for each seam in accordance with the following functions:

$$\text{GlobalLeftPixelEnergy} = \text{median}(\text{LeftNeighborhood}) * W + (1-W) * \text{LeftPixelEnergy};$$

$$\text{GlobalRightPixelEnergy} = \text{median}(\text{RightNeighborhood}) * W + (1-W) * \text{RightPixelEnergy};$$

$$\text{New Pixel} = \text{minimum}(\text{GlobalLeftPixelEnergy}, \text{GlobalRightPixelEnergy}, \text{Energy of pixel directly below current edge}),$$

W is a weighting factor.

4. The method of claim 1, wherein the determining paths for each of the seams comprises:
   selecting a first pixel for a first seam; and
   selecting a second pixel for the first seam from among a set of neighboring pixels of the first pixel, the second pixel having the lowest energy of the set of neighboring pixels.

5. The method of claim 1, wherein the determining paths for each of the seams comprises:
   selecting a first pixel for a first seam;
   determining a first value corresponding to a first set of neighboring pixels of the first pixel, the first value being indicative of the energy of the first set of neighboring pixels;
   determining a second value corresponding to a second set of neighboring pixels of the first pixel, the second value being indicative of the energy of the second set of neighboring pixels; and
   selecting a second pixel for the first seam in accordance with the first value and the second value.

6. The method of claim 5, wherein the selecting the second pixel comprises:
   weighing the energy of a pixel in the first set of neighboring pixels in accordance with the first value; and
   weighing the energy of a pixel in the second set of neighboring pixels in accordance with the second value.

7. The method of claim 5, wherein the first value and the second value correspond to median energy of the first set of neighboring pixels and median energy of the second set of neighboring pixels, respectively.

8. The method of claim 7, wherein the first value and the second value correspond to average energy of the first set of neighboring pixels and average energy of the second set of neighboring pixels, respectively.

9. The method of claim 5, wherein the first set of neighboring pixels and the second set of neighboring pixels comprise a common subset of pixels.

10. The method of claim 1, further comprising:
identifying a set of the seams substantially banding together to define a homogeneous region, from among the plurality of seams; and
removing the seams corresponding to the homogeneous region from the image.

11. The method of claim 10, wherein the identifying a set of the seams comprises identifying at least one partial seam, and the at least one partial seam extending across less than an entirety of the image.

12. The method of claim 11, wherein the identifying the at least one partial seam comprises identifying pixels within one of the seams, being outliers in the seam.

13. The method of claim 1, wherein the identifying a plurality of starting points for a plurality of seams further comprises identifying the starting points alternately from opposite sides of the image.

14. The method of claim 1, wherein the resizing the image comprises inserting pixels into the image at locations corresponding to the seams.

15. The method of claim 14, wherein each of the inserted pixels has an energy value corresponding to the energy of neighboring pixels.

16. The method of claim 1, wherein further comprising identifying a region of interest not traversed by the plurality of seams.

17. A method of resizing an image comprising a plurality of pixels, comprising:
determining energy for each of the pixels in accordance with an energy function;
determining a line energy for each straight line of the image, the line energy corresponding to a sum of the energy of the pixels in each straight line;
identifying a plurality of seams in the image based on the line energy of the pixels;
identifying at least one partial seam based on an outlier method or global thresholds; and
resizing the image by removing the seams and partial seams from the image.

18. The method of claim 17, further comprising:
identifying a homogeneous region in the image by a set of the seams substantially banding together to define the homogeneous region; and
removing the homogeneous region from the image by removing the corresponding seams.

19. The method of claim 18, further comprising, after removing the homogeneous region, resizing the image by scaling.

20. The method of claim 1, wherein the image comprises a plurality of images, and the seams extend across two or more of the images.

21. An apparatus for resizing an image comprising a plurality of pixels, comprising:
means for determining energy for each of the pixels in accordance with an energy function;
means for determining a line energy for each straight line of the image, the line energy corresponding to a sum of the energy of the pixels in each straight line;
means for identifying a plurality of starting points for a plurality of seams in the straight lines having the lowest line energy;
means for determining paths for each of the seams; and
means for resizing the image by applying the seams to the image.

22. An apparatus for resizing an image comprising a plurality of pixels, comprising:
means for determining energy for each of the pixels in accordance with an energy function;
means for determining a line energy for each straight line of the image, the line energy corresponding to a sum of the energy of the pixels in each straight line;
means for identifying a plurality of seams in the image based on the line energy of the pixels;
means for identifying at least one partial seam based on an outlier method or global thresholds; and
means for resizing the image by applying the seams and partial seams to the image.

23. An apparatus for resizing an image comprising a plurality of pixels, comprising:
a processor; and
a memory operatively coupled to the processor, wherein the processor is configured to:
determine energy for each of the pixels in accordance with an energy function;
determine a line energy for each straight line of the image, the line energy corresponding to a sum of the energy of the pixels in each straight line;
identify a plurality of starting points for a plurality of seams in the straight lines having the lowest line energy;
determine paths for each of the seams; and
resize the image by applying the seams to the image.

24. An apparatus for resizing an image comprising a plurality of pixels, comprising:
a processor; and
a memory operatively coupled to the processor, wherein the processor is configured to:
determine energy for each of the pixels in accordance with an energy function;
determine a line energy for each straight line of the image, the line energy corresponding to a sum of the energy of the pixels in each straight line;
identify a plurality of seams in the image based on the line energy of the pixels;
identify at least one partial seam based on an outlier method or global thresholds; and
resize the image by applying the seams and partial seams to the image.

25. A computer software product comprising:
a non-transitory computer-readable medium comprising code for causing an apparatus, for processing an image comprising a plurality of pixels, to:
determine energy for each of the pixels in accordance with an energy function;
determine a line energy for each straight line of the image, the line energy corresponding to a sum of the energy of the pixels in each straight line;
identify a plurality of starting points for a plurality of seams in the straight lines having the lowest line energy;
determine paths for each of the seams; and
resize the image by applying the seams to the image.

26. A computer software product comprising:
a non-transitory computer-readable medium comprising code for causing an apparatus, for processing an image comprising a plurality of pixels, to:
determine energy for each of the pixels in accordance with an energy function;
determine a line energy for each straight line of the image, the line energy corresponding to a sum of the energy of the pixels in each straight line;
identify a plurality of seams in the image based on the line energy of the pixels;
identify at least one partial seam based on an outlier method or global thresholds; and
resize the image by applying the seams and partial seams to the image.

* * * * *